United States Patent [19]

Gulistan

[11] 4,046,054
[45] Sept. 6, 1977

[54] FLARABLE THREADED FASTENER

[75] Inventor: Bulent Gulistan, Malibu, Calif.

[73] Assignee: Deutsch Fastener Corporation, Los Angeles, Calif.

[21] Appl. No.: 712,100

[22] Filed: Aug. 5, 1976

[51] Int. Cl.² .............................................. F16B 13/06
[52] U.S. Cl. ........................................ 85/74; 85/77; 339/276 R
[58] Field of Search ............. 85/74, 75, 76, 73, 77, 85/78, 70, 37, 39; 151/38, 41.74, 41.73; 29/512, 526; 339/276 R, 263 R; 174/153 R

[56] References Cited

U.S. PATENT DOCUMENTS

| 1,821,312 | 9/1931 | Lillig | 151/38 X |
|---|---|---|---|
| 3,009,384 | 11/1961 | Degen et al. | 85/77 |
| 3,389,736 | 6/1968 | Gulistan | 151/69 |
| 3,418,869 | 12/1968 | Herpich | 151/41.73 X |
| 3,465,637 | 9/1969 | Cushman et al. | 85/74 X |
| 3,726,553 | 4/1973 | Reynolds et al. | 85/77 X |

FOREIGN PATENT DOCUMENTS

| 191,807 | 9/1937 | Switzerland | 85/73 |
|---|---|---|---|
| 418,914 | 11/1934 | United Kingdom | 85/77 |

Primary Examiner—Ramon S. Britts
Attorney, Agent, or Firm—Gausewitz, Carr & Rothenberg

[57] ABSTRACT

This invention provides a flarable fastener having a sleeve with a bendable wall at one end and a head at the other. A screw has a shank extending through the sleeve and a head overlying one end of the sleeve, with a knurl holding the screw and sleeve together. A nut is received on the outer threaded end of the shank and includes an axial protrusion dimensioned to enter the end of the sleeve upon advancement of the nut, causing the sleeve to be flared outwardly to form a flange for holding it to a workpiece.

10 Claims, 7 Drawing Figures

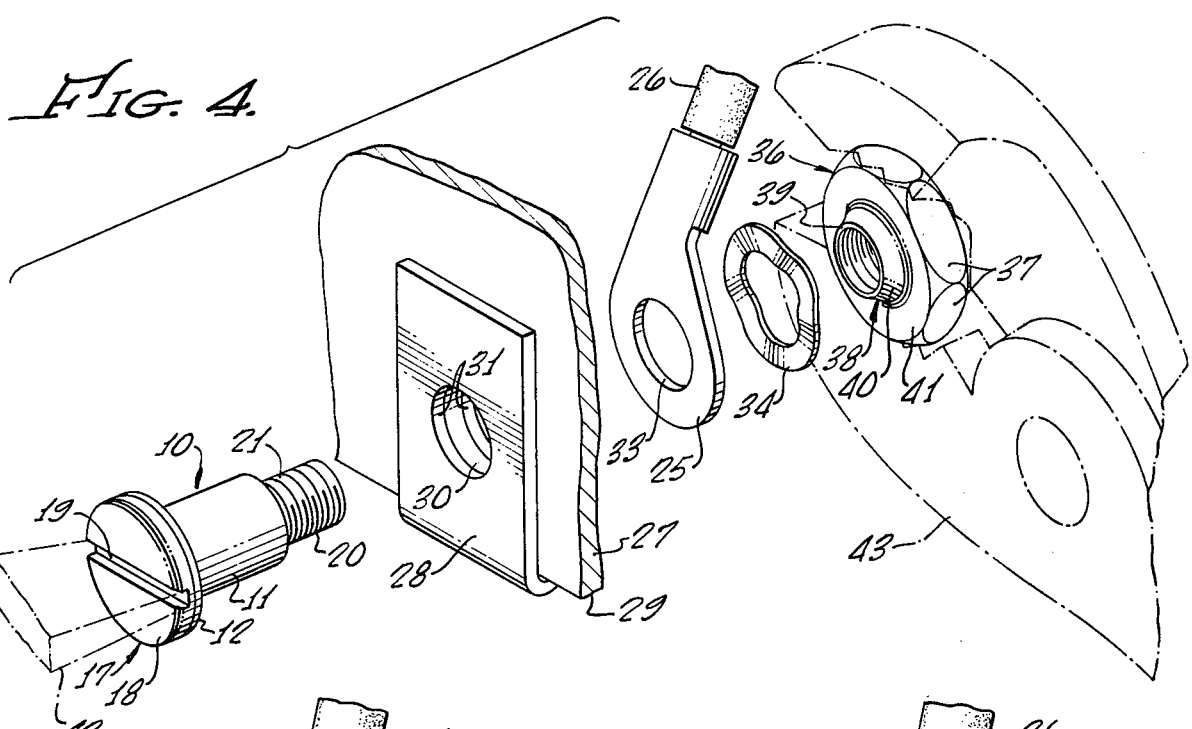
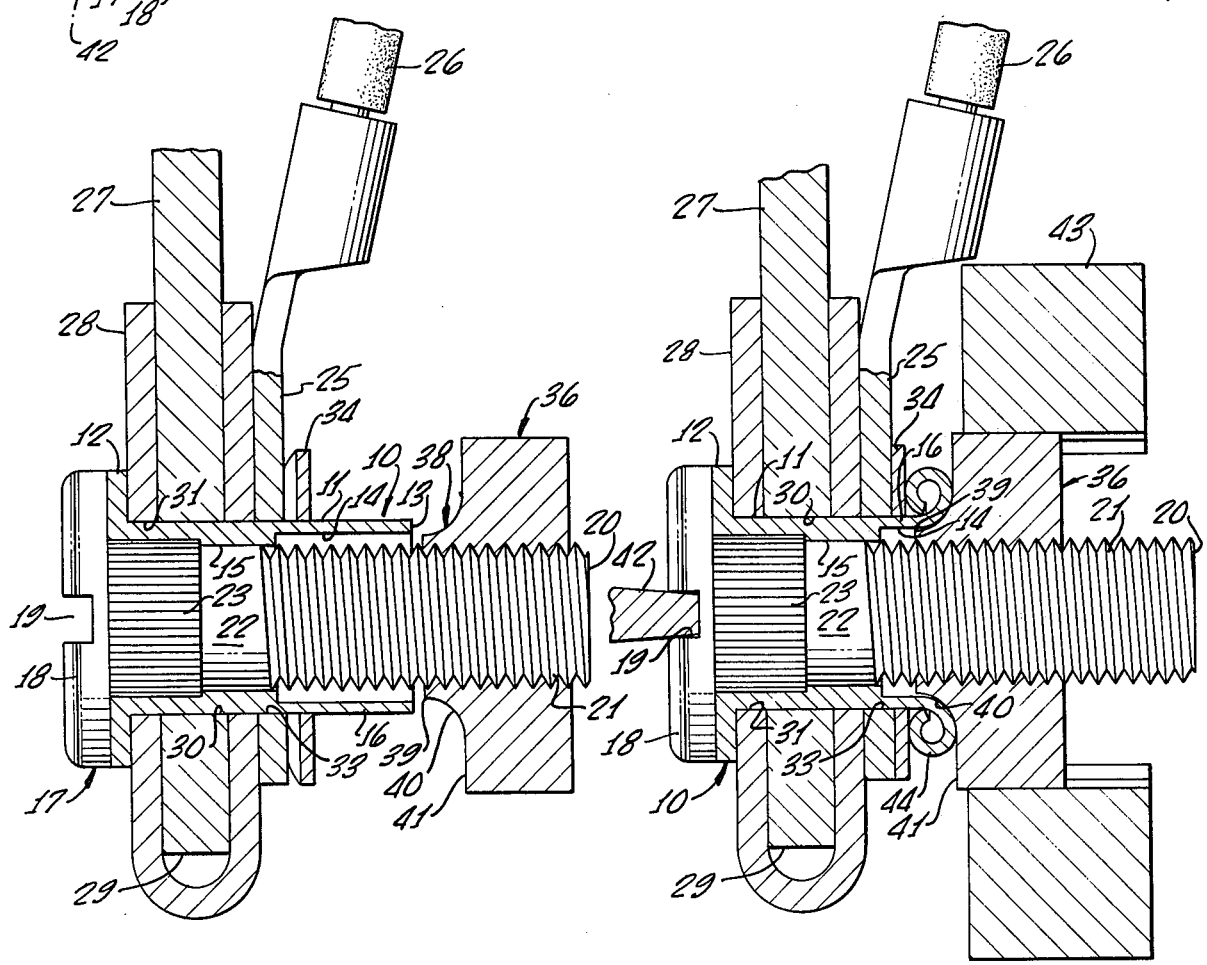

FLARABLE THREADED FASTENER

BACKGROUND OF THE INVENTION

1. Field of the Invention

This invention relates to a fastener.

2. Description of the Prior Art

There is a need for a secure fastener that can provide a permanent connection which will not be loosened upon vibration, yet which is readily secured through the use of simple, ordinary tools. One need for such a fastener is in making secure and long-lasting electrical connections in the field, securing the electrically conductive members together so that the continuity of the electrical circuit will be maintained indefinitely. This may occur, for example, in telephone circuitry where connections frequently must be made to lines that are carried by poles. The connecting device should be simple to operate, as well, and capable of being secured with ordinary tools such as the pliers and screwdriver that a lineman normally carries with him. Otherwise, it becomes difficult to install the fastener and special tools become awkward and require added expense. No prior art device can accomplish all of these objectives.

SUMMARY OF THE INVENTION

The present invention provides an improved fastener that solves the problems outlined above. It is secured by means of simple tools, such as a screwdriver and pliers, providing a secure, permanent attachment that is not loosened by vibrations or other forces.

The fastener includes a sleeve of malleable material having a head at one end and thin-walled bendable portion at the other. A screw extends through the sleeve, with the screw head overlying the sleeve head at the end of the sleeve. A straight knurl on the shank of the screw within the sleeve is embedded in the sleeve wall and locks the screw and sleeve together. A nut is received on the outer threaded end of the shank, the nut having an axial protuberance that tapers outwardly to an end corner which is of smaller diameter than that of the sleeve bore at the end of the sleeve. Accordingly, when the nut is advanced on the screw shank, the protuberance of the nut can enter the sleeve, with the tapered surface than flaring the sleeve wall outwardly to form a flange. This flange cooperates with the sleeve head in securing the sleeve to the workpiece. This may be used for example in securing a terminal to an electrically conductive member. Preferably an undulant washer is included on the exterior of the sleeve so that it is compressed by the flared flange, thereby providing a spring force continually urging the electrically conductive parts into interengagement to insure that the circuit remains intact. The presence of the nut on the outer end of the sleeve helps assure that the flange maintains its bent position and does not straighten out to an extent which would cause a loosening of the parts being secured. However, when this assurance of a tight connection is not absolutely necessary, the nut is removable with the entire connection then being achieved by means of the sleeve.

BRIEF DESCRIPTION OF THE DRAWINGS

FIG. 4 is an exploded perspective view of the fastener and parts to be secured;

FIG. 5 is a longitudinal sectional view of the fastener and parts to be secured as assembled before tightening the nut to flare the sleeve;

FIG. 6 is a view similar to FIG. 5 after the flaring of the sleeve; and

DESCRIPTION OF THE PREFERRED EMBODIMENT

Figure 1:
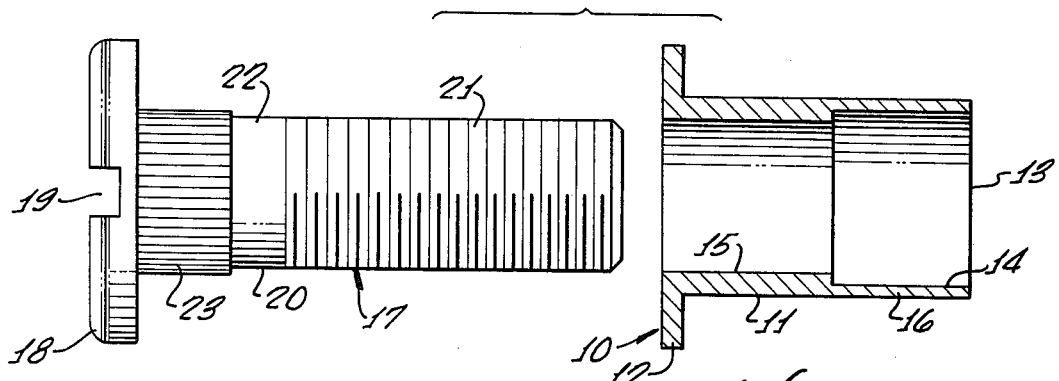
FIG. 1 is an elevational view, partially in section, of the screw and sleeve prior to assembly.

The fastener of this invention includes a sleeve 10 having an outer circumferential surface 11 of cylindrical configuration and constant diameter throughout its length. The sleeve is of malleable material such as brass or aluminum, which have the added advantage of corrosion resistance. A head 12, which is relatively thin in the direction axially of the sleeve, projects radially outwardly from the cylindrical surface 11 at one end of the sleeve.

The bore of the sleeve is circular in cross section and extends from one end of the sleeve to the other. A counterbore extends inwardly from the sleeve end 13, opposite from the head 12, so that there is a section 14 of larger internal diameter than the section 15 adjacent the head. As a result, the sleeve has a relatively thin wall 16, which is bendable, at the location of the bore section 14 of larger diameter.

Figure 2:
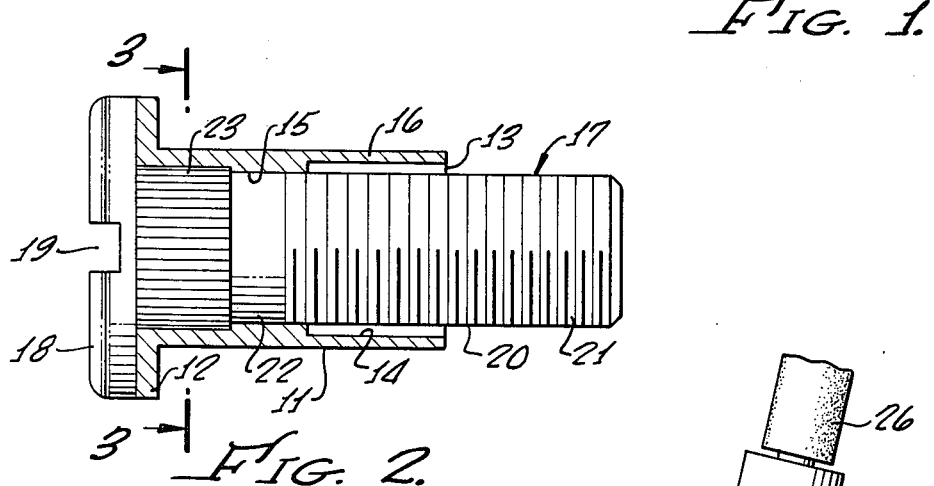
FIG. 2 is a view similar to FIG. 1 after the assembly of the screw and sleeve.
Figure 3:
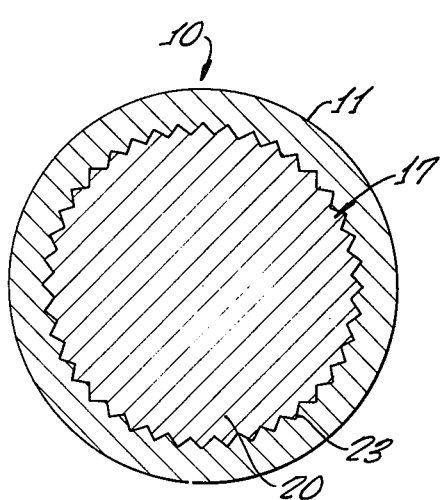
FIG. 3 is a transverse sectional view, taken along line 3—3 of FIG. 2.
Figure 7:
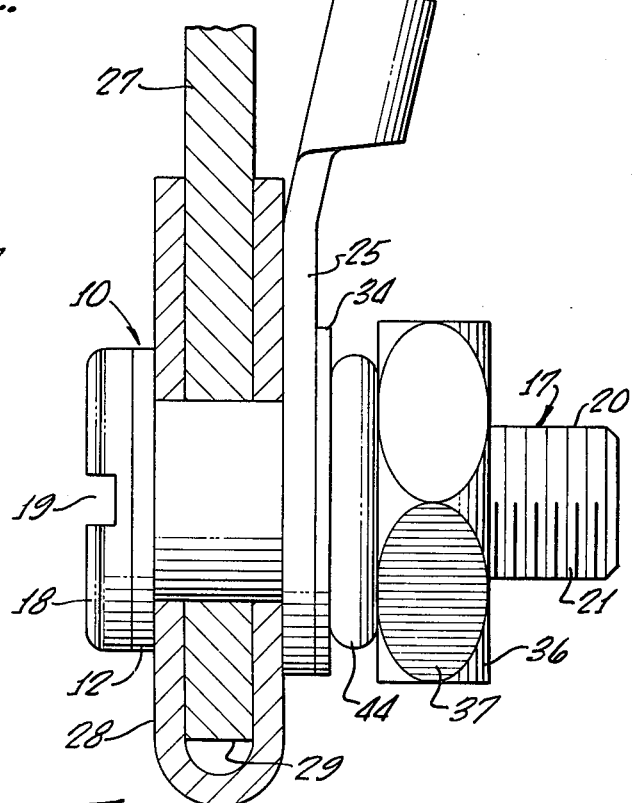
FIG. 7 is a side elevational view, partially in section, showing the completed attachment of the parts by the fastener.

Associated with the sleeve 10 is a screw 17 having a head 18 with a driving recess such as a cross slot 19. The head 18 is of the same diameter as the head 12 of the sleeve which it overlies when the screw and sleeve are assembled. A shank 20 extends from the head 19 and is longer than the sleeve 10 so that it projects outwardly beyond the end 13 of the sleeve when assembled as in FIG. 2. The outer end portion 21 of the shank is exteriorly threaded.

Adjacent the inner end of the threaded portion is a section 22 of the shank which is unthreaded and substantially complementary to the bore section 15. A straight knurl 23 is provided on part of the unthreaded shank portion adjacent the head 18. The knurl 23 provides the screw shank 20 with axially extending ridges or teeth where the shank is of greater lateral dimension than the diameter of the bore section 15 of the sleeve 10. In assembling the sleeve 10 and screw 17, therefore, the knurl 23 is pressed into the wall of the bore at the section 15, thereby becoming embedded in the sleeve. The knurl and wall within which it is embedded cooperate to hold the sleeve 10 and screw 17 together as a unitary assembly, precluding relative axial and rotational movement.

As shown in FIGS. 4 through 7, the fastener of this invention is used in securing a terminal 25 at the end of a wire 26 to a panel 27 so as to provide an electrical connection between the wire and the panel. In this installation a U-shaped metal clip 28 receives the panel 27, overlapping both sides of the panel upwardly of its bottom edge 29. The panel 27 and clip 28 are provided with openings 30 and 31, respectively, which are aligned when the clip is installed on the panel. The sleeve 10 is extended through the openings 30 and 31, bringing the undersurface of its head 12 adjacent one side of the clip 28. The parts are dimensioned such that the sleeve extends well beyond the clip 28 on the opposite side. The terminal 25, which has an opening 33, is fitted over the sleeve surface 11 beyond the clip 28. A washer 34 is positioned next to the outer surface of the terminal 25, this washer preferably being the undulant or wavy type and of resilient material.

A nut 36 then is threaded onto the outer part of the threaded portion 21 of the shank 20 of the screw 17. On the periphery of the nut 36 are flats 37 providing it with a hexagonal countour generally as in a conventional nut. On the end of the nut facing the sleeve 10, however, is an axial projection 38 of outwardly tapering dimension. The diameter of the outer corner 39 of the projection 38 is slightly less than the interior diameter of the sleeve 10 at the larger portion 14 formed by the counterbore. From the corner 39 the projection 38 includes a concave, smoothly curved outer surface 40 which diverges to the radial wall 41 of the nut from which the protrusion 38 extends and which is considerably larger radially than the sleeve diameter.

The fastener is secured by conventional tools such as a screwdriver 42 and pliers 43. The screwdriver bit is inserted into the driving slot 19 in the head 18 of the screw, holding the assembly inwardly with the underside of the sleeve head 12 engaging the outer surface of the clip 28. In this position, the thin-walled portion 16 of the sleeve projects outwardly beyond the terminal 25. The nut 36 then is advanced by rotation, which causes the protuberance 38 to enter the sleeve 10 at its outer end 13. This can occur because the protuberance 38 at its outer corner 39 is of smaller diameter than the bore section 14. As the nut is advanced relative to the sleeve 10, the thin-walled portion 16 is flared outwardly by the curved concave surface 40. Rotation of the sleeve with the nut 36 is precluded by the connection to the screw 17 at the knurl 23. The inward axial force of the nut 36 against the sleeve 10 is transmitted by the sleeve head 12 to the screw head 19, which act as abutments to preclude relative axial movement of the sleeve and screw. The advancement of the nut 36 produces a rolled flange 44, as illustrated in FIG. 6, as the thin-walled sleeve end is deflected by the concave nut surface 40 and the adjoining radial surface 41. Thus, the nut 36 acts as a flaring tool. The flared flange 44 cooperates with the sleve head 12, reinforced by the screw head 18, in holding the terminal 25 to the panel 27. The thin-walled part 16 of the sleeve is proportioned in length so as to provide ample material to give the flange 44 adequate dimension and strength.

In the fully secured position, the flange 44 pushes the undulant washer 34 inwardly against the terminal 25 so that the washer is flattened. As a result, the washer 34 provides a continual spring force that pushes the terminal 25 inwardly against the clip 28. Although an attachment can be made when using a conventional washer, or even no washer, the spring force of the washer 34 helps assure a electrical connection between the terminal 25 and the clip 28, and hence to the panel 27, throughout a prolonged period, irrespective of vibrational forces or the like to which the assembly may be subjected. The presence of the nut 36 on the screw shank reinforces the flange 44, maintaining it in its flared position, holding the undulant washer 34 against the terminal 25 in the presence of any vibrational or axial forces which would tend to loosen the flange.

Thus, the unit provides a secure mechanical connection and a complete electrical circuit which will be maintained indefinitely. The installation is completed very rapidly and with only conventional tools such as those carried by a telephone lineman.

The foregoing detailed description is to be clearly understood as given by way of illustration and example only; the spirit and scope of this invention being limited solely by the appended claims.

I claim:

1. A fastener comprising
   a sleeve of malleable material, said sleeve having
      a cylindrical exterior surface,
      a head at one end thereof,
      and a cylindrical bore therethrough,
         said bore including a counterbore adjacent the opposite end of said sleeve, whereby said sleeve at said opposite end has a reduced-thickness bendable wall,
   a screw, said screw having
      a head,
      and a shank extending from said head, said head of said screw overlying said head of said sleeve, and having surface means for engagement by a driving tool, said shank being longer than said sleeve and having a threaded outer portion projecting outwardly from said opposite end of said sleeve,
      said sleeve and said screw including cooperative means for preventing relative movement of said sleeve and said screw,
   and a separate, threaded nut received on said threaded end of said shank, said nut being rotatable relative to said shank and to said sleeve, and having surface means adapted for engagement by a driving tool,
      an axial protuberance at the end thereof adjacent said opposite end of said sleeve,
         said protuberance terminating in an outer end thereof which is of smaller diameter than the diameter of said counterbore, said protuberance including a concave surface diverging radially outwardly from said end of said protuberance to a substantially radial wall axially inwardly of said protuberance, whereby upon relative rotation of said nut and said shank so as to advance said nut towards said opposite end of said sleeve,
         said protuberance is caused to enter said counterbore and said concave surface to bend said relatively thin wall outwardly for forming a flange on said opposite end of said sleeve.

2. A device as recited in claim 1 in which said nut includes a substantially radial wall at the axially inner end of said protuberance of said nut for cooperating with said surface of said protuberance of said nut in forming said flange.

3. A device as recited in claim 1 in which said means for retaining said screw to said nut includes a straight knurl on said shank of said screw adjacent said screw head, said knurl being embedded in the wall of said bore of said sleeve adjacent said one end of said sleeve.

4. A device as recited in claim 3 including in addition a washer circumscribing said sleeve inwardly of said opposite end of said sleeve, said washer having an undulant contour and being of resilient material, whereby upon compression thereof by said flange formed on said end of said sleeve said washer provides a spring force.

5. The method of attaching a first member to a second member comprising the steps of
   providing aligned openings in said first and second members, preparing a sleeve with a reduced-thickness bendable wall at one end, positioning said sleeve in said openings with said one end of said sleeve projecting outwardly beyond said first and second members, preparing a screw having a shank including a threaded portion and a portion with movement preventing means thereon and having an enlarged head with tool engaging means thereon, extending said screw through said sleeve with the head of said screw adjacent the opposite end of said sleeve and the shank of said screw projecting outwardly beyond said one end of said sleeve, the movement preventing means cooperating with said sleeve to prevent movement between said sleeve and said screw, preparing a threaded nut with tool engaging means thereon separate from said sleeve so as to have one end dimensioned smaller radially than the bore of said one end of said sleeve and a concave divergent wall extending from said one end to a dimension larger than said bore of said one end of said sleeve, and then threading said nut on said shank, rotating said nut relative to said shank and to said sleeve by gripping the tool engaging means on said nut so as to advance said nut axially relative to said shank and cause said one end of said nut to enter said bore, and said divergent wall of said nut to bend said bendable wall of said sleeve outwardly, thereby to form a flange for retaining said sleeve to said first and second members.

6. The method as recited in claim 5 in which said nut is maintained on said shank following said step of said bending of said bendable wall outwardly.

7. The method as recited in claim 5 in which said movement preventing means comprises tooth means on the periphery of said shank thereof, and said tooth means are embedded in the wall of said sleeve within the bore thereof when said screw is inserted into said sleeve.

8. The method as recited in claim 5 in which said sleeve is provided with a head at said opposite end thereof, and in which said head of said sleeve is positioned in engagement with one of said first and second members, and said head of said screw is positioned in engagement with said head of said sleeve during said bending of said bendable wall.

9. The method as recited in claim 5 wherein said tool engaging means on said head of said screw comprises a driving recess, and in which for preventing said rotation of said screw a screwdriver is inserted into said recess and held against rotation.

10. The method as recited in claim 9 in which for said advancing of said nut said nut is rotated by a pair of pliers.

* * * * *